Feb. 14, 1933.   W. M. ANDERSON   1,897,028
PLUG AND INSERTING QUILL AND METHOD OF CONNECTING THE SAME
Filed Nov. 14, 1927
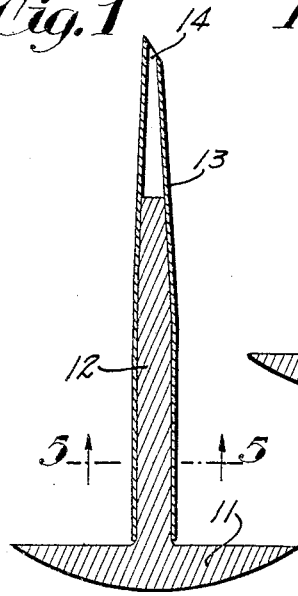
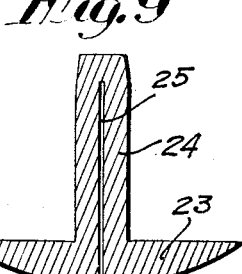
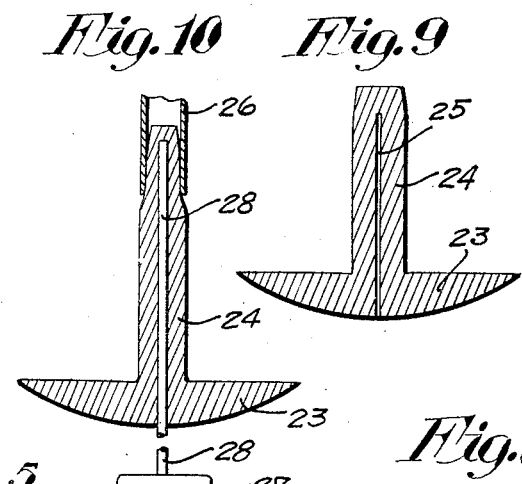
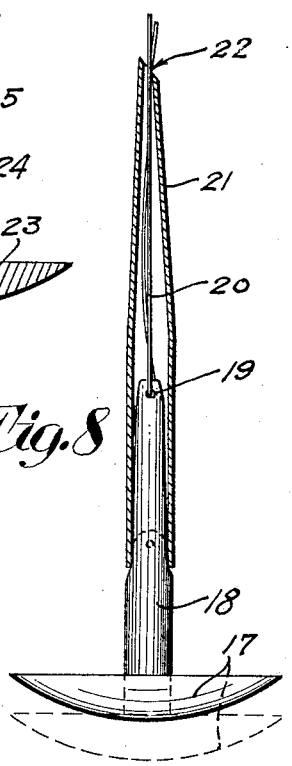
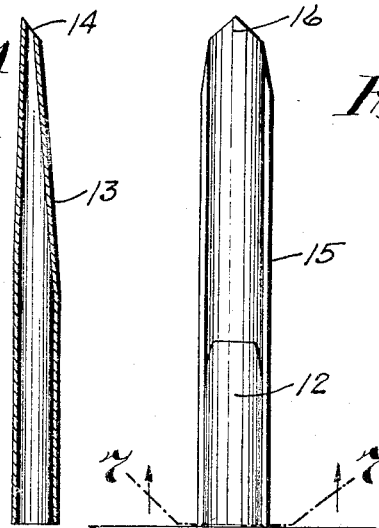
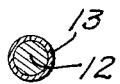
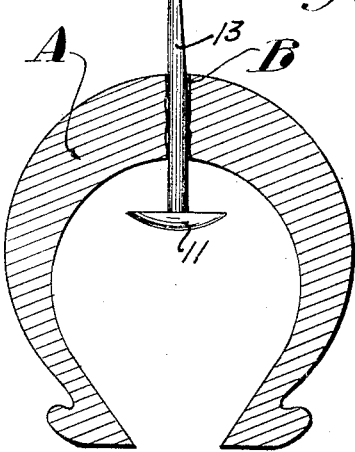
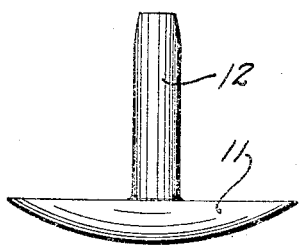
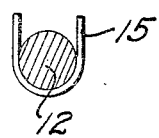
Inventor
William M. Anderson
By his Attorneys
Merchant and Kilgore Patented Feb. 14, 1933

1,897,028

UNITED STATES PATENT OFFICE

WILLIAM M. ANDERSON, OF MINNEAPOLIS, MINNESOTA, ASSIGNOR, BY MESNE ASSIGNMENTS, TO KEX COMPANY, INCORPORATED, OF ST. LOUIS, MISSOURI, A CORPORATION OF MISSOURI

PLUG AND INSERTING QUILL AND METHOD OF CONNECTING THE SAME

Application filed November 14, 1927. Serial No. 233,108.

My present invention relates to a tire casing repair plug of the mushroom type and more particularly to a quill for inserting the stem of such a plug into a punctured hole in a tire casing. Said invention further provides an improved method of applying the quill to the stem of a tire casing repair plug.

It is now customary in supplying tire casing repair plugs to the trade to furnish a needle with a given number of plugs for drawing the stems of the plugs into punctured holes in tire casings and then releasing the same. This needle is provided in its base with a socket of such size as to receive and hold the stem of a plug. The base portion of the needle at the socket therein is longitudinally slit whereby the socket may be expanded to receive said stem and then released onto the stem to hold the same in the needle. Said needle, after a plug has been attached thereto, is inserted through a punctured hole in a tire casing from the inside thereof and then pulled from the stem of the plug to release the same in said hole.

In making a repair in a tire casing by means of a plug, it is essential to select a plug having a stem with a diameter greater than that of the hole in the tire casing to be repaired in order that the stem will be expanded against the tire casing at the walls of the hole therein in order to completely close the same and hold the plug in place.

Needles now used are objectionable for the reason that their external diameter is greater than that of the stem of the plug for which they are designed to hold, hence if the plug selected for use has a stem, the diameter of which is greater than that of the punctured hole to be closed thereby, said needle will enlarge said hole when forced therethrough so that the same will be too large for the stem of the plug and the plug will not hold, or if the needle used has a diameter substantially the same as that of the punctured hole, the stem of the plug held thereby will be too small for the hole and the plug will not hold.

In case a plug selected for a repair has a stem, the normal diameter of which is larger than the hole to be closed thereby, considerable pressure is required to force the needle through the hole and hence the person making a repair invariably forces the needle part way through the tire casing and then grasps the projecting pointed end portion thereof by means of a pair of pliers or other tool and uses the same in pulling the needle through the tire casing. This use of a pair of pliers on the needle roughens the same so that the next time the needle is used, greater pressure is required to force the same through a punctured hole and after comparatively little use, the needle becomes so rough that it is very difficult to force the same through the tire casing.

One of the primary objects of my invention is to provide an individual quill for each tire plug so that the same may be thrown away after it has been used to draw the stem of a plug into a punctured hole in a tire casing. The invention further provides a quill having an external diameter less than that of the stem of the plug to which it is applied and with an exterior that is perfectly smooth and completely closed so that the same may be inserted through a punctured hole in a tire casing with comparatively little friction. The invention further provides a novel method of inserting the stem of a plug into the quill for the purpose of attaching the quill to the plug.

In the accompanying drawing, which illustrates the invention, like characters indicate like parts throughout the several views.

Referring to the drawing:

Fig. 1 is a view in central longitudinal section showing the quill applied to the stem of a tire casing repair plug of the mushroom type;

Fig. 2 is a view showing the quill partly inserted through a punctured hole in a tire casing for the purpose of inserting the stem of said plug in said hole;

Fig. 3 is a side elevation of the tire repair plug;

Fig. 4 is a view of the quill in central longitudinal section;

Fig. 5 is a detail view in section taken on the line 5—5 of Fig. 1;

Fig. 6 shows one method of applying the quill to the stem of a plug;

Fig. 7 is a detail view with the stem of the plug sectioned on the line 7—7 of Fig. 6;

Fig. 8 shows another method of applying the quill to the stem of a plug;

Fig. 9 shows a slight modification of the plug; and

Fig. 10 shows the method of inserting the stem of the plug shown in Fig. 9 into a quill.

The tire casing repair plugs illustrated are of the mushroom type and in Figs. 1, 2, 3, 5, 6 and 7 the head of the plug is indicated by the numeral 11 and the stem thereof by the numeral 12.

The quills shown in the drawing are formed from sheet metal and in Figs. 1, 2, 4 and 5 the quill is indicated by the numeral 13. The base portion of the quill 13 is in the form of a cylinder having a constant diameter and the other end portion thereof is tapered and the point thereof cut transversely oblique, as indicated at 14. It is important to note that the taper of the quill 13 is such as to leave the respective end of the quill open and not close the passage therethrough. The normal diameter of the stem 12 is larger than the external diameter of the quill 13 so that said quill may be inserted through a punctured hole B in a tire A, as shown in Fig. 2, with very little effort, and when detached from the stem 12, said stem will expand against said casing at the walls of the hole B and thereby completely close the hole and hold the plug in place.

Figs. 6 and 7 show one method of attaching the quill 15 to the stem 12 of the plug and which quill is identical in structure to that of the quill 13. In carrying out this method of attaching the quill to the plug, said quill 15 is primarily formed as shown in Fig. 7, and the stem 12 laid therein with the base of said quill engaging the under side of the head 11. While the plug and quill are thus held by any suitable means, the longitudinal edge portions of said quill are rolled to tubular form around the stem 12. This folding of the quill 15 around the stem 12 compresses said stem and thereby causes the same to move longitudinally in said quill to an elongated shape to reduce the diameter thereof. During the folding of the quill 15 around the stem 12, the head 11 of the plug is held by any suitable means, not shown, against movement away from the base of said quill. The point of the quill 15 is cut oblique, as indicated at 16.

In Fig. 8 the head of the plug is indicated by the numeral 17 and the stem thereof by the numeral 18. A transverse hole 19 is formed in the stem 18 near the outer end thereof and a pull wire 20 inserted therethrough. The wire 22 is folded upon itself and forms an extension of the stem 18. The quill applied to the stem 18 is indicated by the numeral 21 and the oblique end thereof by the numeral 22.

The method of applying the quill 21 to the stem 18 consists in inserting the wire 22 through said quill and pulling the connected end portion of the stem 18 slightly into the base end of the quill 21, as indicated by broken lines in Fig. 8. With the plug and quill thus assembled they are sold to the trade and so remain until used. When a plug is to be used, the stem 18 is pulled completely into the quill 21 by means of the wire 22. The pull on the wire 22 elongates the stem 18 and thereby reduces the normal diameter thereof so that it draws comparatively easy into the quill 21.

In Fig. 8, the plug, by means of full lines, is shown with its stem 18 pulled part way into the quill 21. After the stem 18 has been pulled completely into the quill 21 with the base of said quill engaging the under side of the head 17, the wire 22 is detached from the stem 18 by applying sufficient pull thereto to tear the same from the stem 18, or, if desired, the projecting end portions of the wire 22 may be severed at the oblique end 22 by means of a pair of cutting pliers.

The reason for not pulling the stem of a plug completely into a quill at the time of manufacture is that said plug is reduced to such a small diameter that it would not again expand to its full diameter if held compressed for too long a time. It is important to note that the normal diameter of the stem of a quill is considerably larger than the external diameter of the quill to be attached thereto, thus permitting the use of a quill having a diameter not greater than a punctured hole in a tire casing through which it is to be inserted. This relatively small quill holds a plug stem having a diameter considerably larger than the diameter of the punctured hole so that when said quill is detached from the stem, said stem will expand against the tire at the walls of the punctured hole therein and thereby completely close the same and hold the plug in place.

Referring now to the invention as illustrated in Figs. 9 and 10, the head of the plug is indicated by the numeral 23 and the stem thereof by the numeral 24. An axial hole 25 extends through the head 23 and terminates in the stem 24 near the outer end thereof. In applying this plug to the quill 26 a tool 27 having a long stem 28 is inserted into the hole 25 and the stem 24 pressed into the quill 26 thereby. Pressure applied to the tool 27 will cause an elongation of the stem 24 and thereby cause the same to enter the quill 26 with comparatively little resistance and after the stem 24 has been inserted completely into the quill 26, the tool 27 is detached from the plug.

After a plug has been inserted into a punctured hole in a tire casing by means of a quill to which it is attached, said quill is detached from the stem of the plug by the use of a pair of pliers or other tool and then thrown away. At the time a quill is detached from a plug, the pull thereon will stretch the stem thereof and hold the head of the plug tightly against the inner surface of the tire casing and as the quill is withdrawn from the stem, said stem will expand against the tire casing at the walls of the punctured hole and thereby fill the hole and securely hold the plug with its head tightly drawn against the inner face of said casing. The projecting outer end portion of the stem of the plug is severed at the outer surface of the tire casing.

If desired, cement may be applied to the under side of the head of the plug before inserting the same into a punctured hole in the tire casing so that said head will be cemented to said casing.

From the above description it is evident that in making a repair in a tire casing it is highly important to select a plug, the stem of which has a normal diameter larger than that of the punctured hole to be closed thereby and having an attached quill the external diameter of which is not greater than that of said hole.

What I claim is:

1. The method of making a self-contained tire-casing repair plug for insertion from within the casing, which comprises applying a quill to the stem of a tire casing repair plug having a pull wire attached thereto and of a diameter greater than the internal diameter of the quill which consists in inserting the wire through the quill and pulling the outer end portions of the stem into the quill to connect said plug and quill and thereafter when the plug is to be used in completing the making of the self-contained plug for repair use by pulling the stem completely into the quill.

2. The method of making a self-contained tire-casing repair plug for insertion from within the casing, which comprises applying a quill to the stem of a tire casing repair plug having a pull wire attached thereto and of a diameter greater than the internal diameter of the quill which consists in inserting the wire through the quill and pulling the outer end portions of the stem into the quill to connect said plug and quill and thereafter when the plug is to be used in completing the making of the self-contained plug for repair use by pulling the stem completely into the quill and finally in detaching the wire from the stem.

In testimony whereof I affix my signature.

WILLIAM M. ANDERSON.